United States Patent [19]

Mummert

[11] Patent Number: 5,120,185

[45] Date of Patent: Jun. 9, 1992

[54] CONTROL MECHANISM FOR SELECTIVE ENGAGEMENT AND DISENGAGEMENT OF A MOTOR DRIVE

[76] Inventor: Craig Mummert, 2 Teakwood La., Wilmington, Del. 19810

[21] Appl. No.: 623,085

[22] Filed: Dec. 6, 1990

[51] Int. Cl.⁵ .............................................. B60P 3/12
[52] U.S. Cl. ........................................ 414/563; 74/527; 192/995; 254/279; 254/323
[58] Field of Search .............. 414/565, 559; 280/402; 254/279, 323, 365, 370; 74/503, 527; 192/995

[56] References Cited

U.S. PATENT DOCUMENTS

| Re. 23,791 | 3/1954 | Alderson et al. ............ 254/279 X |
| 649,444 | 5/1900 | Good ............................ 74/503 X |
| 2,497,379 | 2/1950 | Vandergrift, Sr. et al. ...... 414/563 |
| 3,292,907 | 12/1966 | Akins et al. ................. 254/365 X |
| 3,912,093 | 10/1975 | Kruschke .................... 414/563 X |
| 4,274,791 | 6/1981 | Moon ............................ 414/563 |
| 4,838,578 | 6/1989 | Baxter ........................ 74/503 X |

Primary Examiner—David A. Bucci
Attorney, Agent, or Firm—Connolly & Hutz

[57] ABSTRACT

A control mechanism for the selective engagement and disengagement of a motor drive includes an elongated handle which is connected to the control arm of the motor drive wherein the position of the control arm determines whether the motor drive is engaged or disengaged. The handle is selectively movable to two positions corresponding to the engaging and disengaging positions of the control arm. The handle is resiliently urged to its positions. Locking structure is provided to selectively hold the handle in each of the positions.

15 Claims, 2 Drawing Sheets

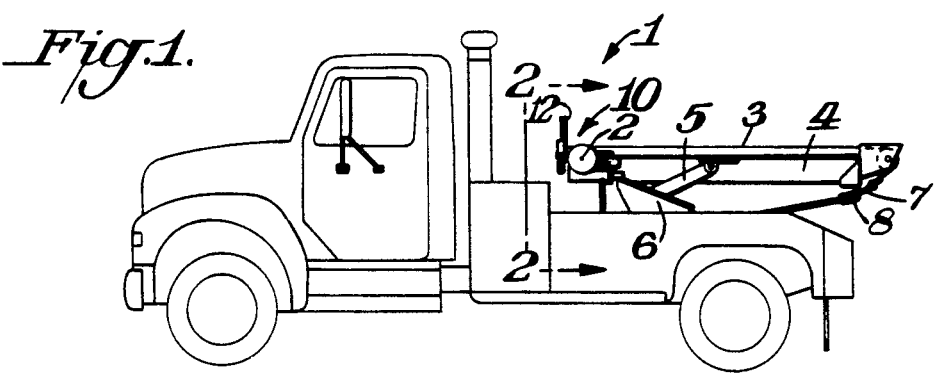
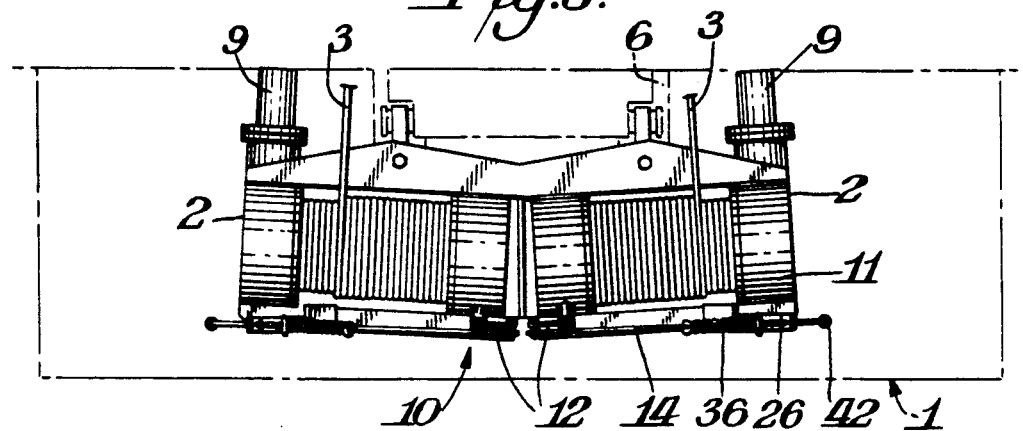
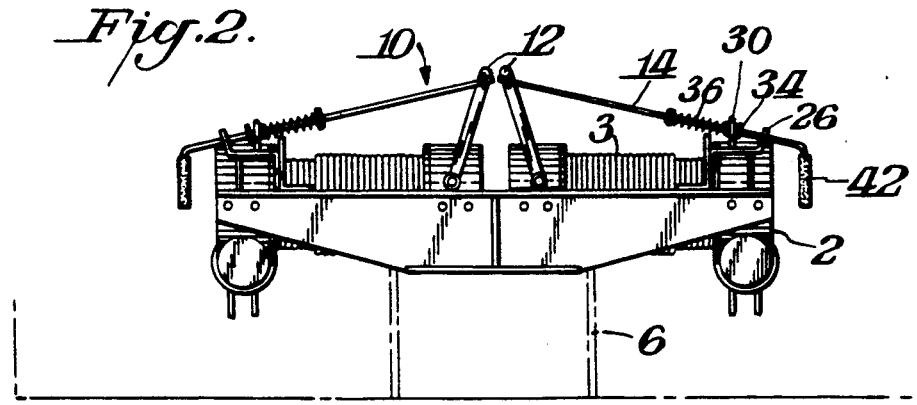
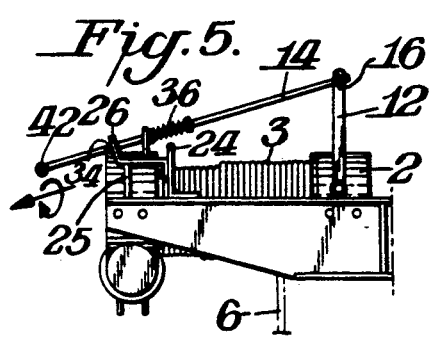
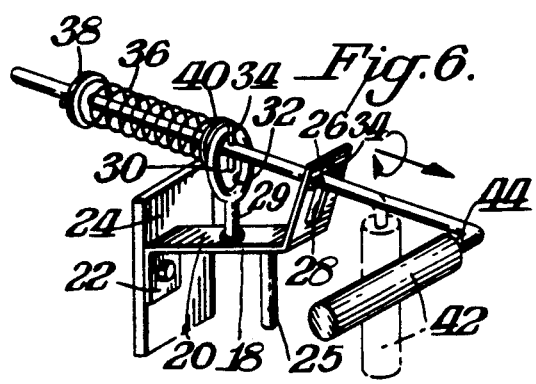

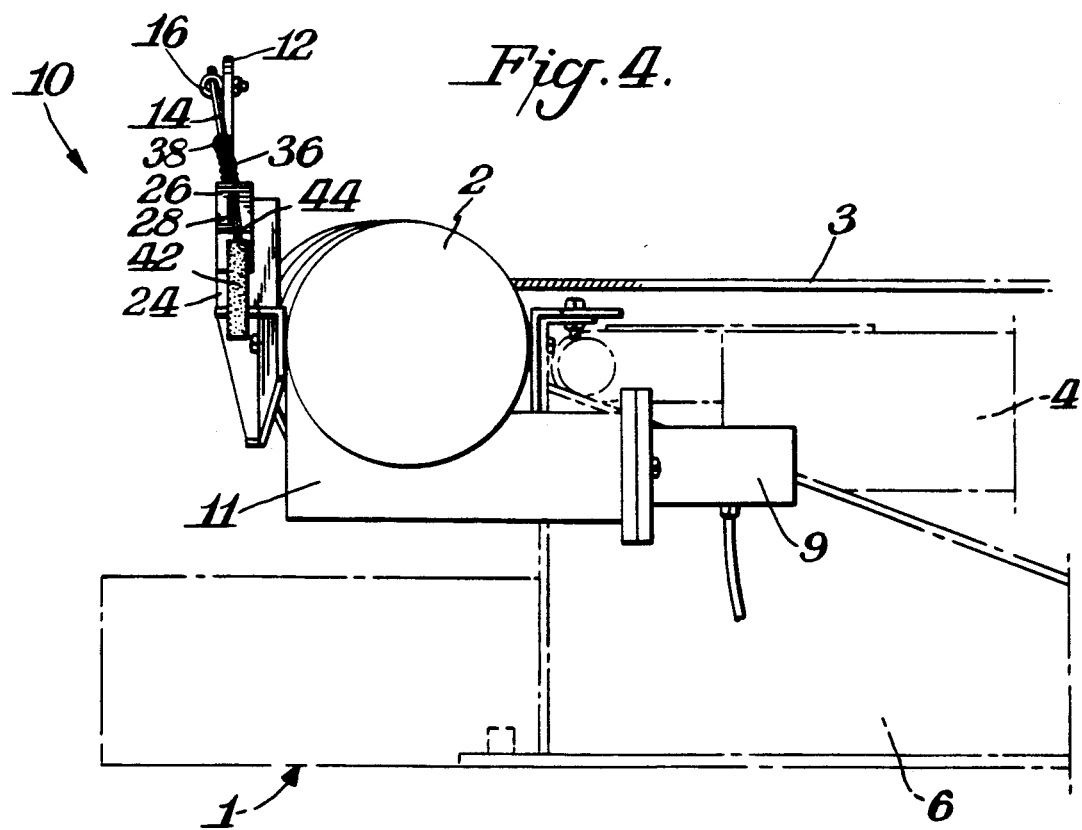

CONTROL MECHANISM FOR SELECTIVE ENGAGEMENT AND DISENGAGEMENT OF A MOTOR DRIVE

BACKGROUND OF INVENTION

This invention relates to a control mechanism for the selective engagement and disengagement of a motor drive. Frequently motor drives such as gear boxes are provided with control handles which are pivoted to one of two positions. In one of the positions the motor drive is engaged and in the other position the motor drive is disengaged. Various forms of such motor drives have been used wherein the control arms are inconveniently located. For example, tow trucks include a pair of motor drives located generally along the longitudinal center of the truck remote from the rear end of the truck. It is difficult for an operator to reach the control arm because of its location away from the side edges of the truck. Accordingly, it would be desirable if some mechanism could be provided which would permit the operator to readily move the control arm to its engaging and disengaging positions while remaining at a convenient location at the side of the truck.

SUMMARY OF INVENTION

An object of this invention is to provide a control mechanism which fulfills the above needs.

A further object of this invention is to provide such a control mechanism which is particularly useful for controlling the engagement and disengagement of a winch having a cable.

A further object of this invention is to provide such a control mechanism which is particularly usable on tow trucks wherein two sets of mechanisms would be provided.

In accordance with this invention the control mechanism includes an elongated handle which would be connected to the control arm of the motor drive so that by moving the handle to one of two positions the control arm is correspondingly moved to either its engaging or disengaging position. The handle is resiliently urged to its positions. Lock means is provided for selectively holding the handle in each of the two positions.

The lock means may include a bracket having an upstanding projection with a slot through which the handle slides. A second projection or abutment member would be mounted spaced from the first projection or abutment member and would also contain a hole for permitting the handle to slide through that abutment member. The handle would be rotatably connected to the control arm and the handle would include a stop member such as a pin. By rotating the handle, the handle could be moved for selectively passing the pin through the slot so that the pin can selectively abut against the projections.

THE DRAWINGS

FIG. 1 is a side elevation view of a conventional tow truck incorporating the control mechanism of this invention;

FIG. 2 is an elevation view taken along the line 2—2 of FIG. 1;

FIG. 3 is a top plan view of the mechanism shown in FIG. 2;

FIG. 4 is an end elevation view taken from the right hand side of FIG. 3;

FIG. 5 is an elevation view showing the mechanism in its position wherein the motor drive is disengaged; and FIG. 6 is a perspective view of the mechanism shown in FIGS. 1-5.

DETAILED DESCRIPTION

FIG. 1 illustrates a conventional tow truck 1 with which the mechanism 10 which is the subject of this invention may be used. Tow truck 1 would include, for example, a pair of motor driven winches 2 each having a cable 3 which extends over boom 4. A lifting cylinder 5 is mounted to boom 4 and frame assembly 6. Lifting cylinder 5 is pivotally mounted to selectively permit the boom to be elevated for a towing operation. A hook 7 is provided at the end of each cable 3. As shown in FIG. 1 hook 7 is secured in a retaining strap 8 when the truck 10 is not being used for towing purposes.

When it is desired to use truck 1 for towing, for example, a vehicle, it is necessary to extend cables 3. This should be done by disengaging the motor drive gear box so that the cables 3 can become free wheeling and thus can be readily pulled away from boom 4 to the necessary length for attachment to the vehicle. After the hooks 7 have been attached to the vehicle it is necessary to reengage the motor drive so that the winch 2 can be rotated in the reverse direction to pull the vehicle toward the truck 1 whereupon boom 4 is elevated and the truck can be towed.

As shown in FIG. 3 the mechanism for operating winch 2 includes a hydraulically operated motor 9 connected to gear box 11 to drive the winch 2 for winding cable 3. The engagement or disengagement of the motor drive is controlled by arm or lever 12. For example, in the position shown in FIG. 2 control arms 12 are in the engaged position wherein cable 3 is not free wheeling. In the position shown in FIG. 5, however, arm 12 has been pivoted to, for example, a generally vertical position, wherein the motor drive is disengaged.

The above description relates to generally conventional structure on the tow trucks. With such conventional tow trucks arms 12 are generally along the longitudinal center of the tow truck body remote from the rear end or hooks 7 of truck 1. Additionally, because arms 12 are located generally along the longitudinal center of the tow truck body, the arms are relatively inaccessible to the operator who would be standing on the ground adjacent the truck body. Various techniques have been used to control the engagement or disengagement of the motor drive. For example, an operator might climb on the truck body, pull the arm 12 to pivot it to its desired position and then insert some locking structure adjacent the arm to hold or wedge it in a fixed position. When it is desired to again move the arm to its original position the operator must again crawl on the truck and remove the locking structure. Since tow trucks conventionally include two sets of such motor drives it is necessary to repeat this procedure from each side of the truck.

Control mechanism 10 overcomes the inconveniences which accompany the conventional manners of controlling the selective engagement and disengagement of the motor drive. As shown herein mechanism 10 includes an elongated handle 14 connected at one end to arm 12. Any suitable manner of connection may be used. In the preferred practice of the invention the connection is one which permits handle 12 to be rotated at least 90° by the rotatable connection 16. This could be done by passing handle 14 through an eye and providing a pin or abutments on handle 14 to prevent the handle from being removed from the eye.

Mechanism 10 also includes a pair of abutment members for selectively locking handle 14 in two different positions. In the preferred practice of the invention the abutment members comprise a bracket 18 having a base 20 with a downward extension 22 mounted to an L-shaped bracket 24 secured to frame 6. Post 25 provides added support for base 20. Base 20 also includes an upward extension 26 having an elongated vertically extending slot 28 through which handle 14 passes. An eye 29 is connected to base 20. Eye 29 has a ring formation 30, with handle 14 passing through the hole or opening 32 in the eye. Eye 29 functions as a second projection or abutment member.

A stop member preferably in the form of a shear pin 34 is fixedly secured to handle 14 and is dimensioned so that when handle 14 is in the position shown in solid in FIG. 6 pin 34 will press against abutment 26 to prevent handle 14 from moving toward the left hand side of FIG. 6. When however, handle 14 is rotated to the position shown in phantom, the 90° rotation permits pin 34 to be aligned with slot 28 and thus pass through slot 28 until it engages ring 30 of eye 29. Further movement toward the left is prevented by pin 34 contacting ring 30.

A spring 36 is mounted around handle 14 by being secured between disks 38, 40. Disk 38 is secured to handle 14 and disk 40 is secured to eye 29. Spring 36 acts to resiliently urge handle 14 in the direction toward the left in FIG. 6. Accordingly, when pin 34 abuts against flange or projection 26 or when pin 34 abuts against ring 30 the handle is locked in that respective position because of the resilient urging by spring 36 of the stop member or pin 34 against its corresponding abutment member 26 or 28.

As shown in FIG. 6 base 20 of bracket 18 is disposed at a nonperpendicular and nonparallel angle to handle 14. Similarly, flange or offset 26 is also disposed at a nonperpendicular and nonparallel angle to both base 20 and handle 14. Handle 14 includes a gripping member 42 located on an offset extension 44 for convenient manipulation of handle 14.

As illustrated, when mechanism 10 is used on a tow truck two sets of identical structure would be provided, one for each arm 12.

In operation when it is desired to tow a vehicle, truck 1 would be driven to a location near the vehicle. During this stage of operation mechanism 10 would be in the condition shown in FIG. 2 and shown in phantom in FIG. 6 wherein arm 12 is disposed in its motor drive engaged position. While in this position, cables 3 are not freewheeling. When it is desired to secure the hooks 7 to the vehicle to be towed, handles 14 are pulled away from the center of the truck body (i.e. toward the right in FIG. 6) in opposition to the resilient force of spring 36. This pulling action continues until pin 34 passes through slot 28. If necessary, handle 14 may be rotated to align pin 34 with slot 28. After pin 34 has passed through slot 28 handle 14 is rotated so that pin 34 is out of alignment with slot 28 and pin 34 abuts against flange 26. Because of the resilient force of spring 36 handle 14 is being urged toward the left of FIG. 6 and is locked in position by the contact of pin 34 against the outer surface of flange 26. This motion causes control arm 12 to be moved from the position shown in FIG. 2 to its second or disengaged position of FIG. 5. With the motor drive disengaged cables 3 becomes freewheeling. Hook 7 is removed from retaining strap 8 and the hook is pulled the necessary length for being secured to the vehicle to be towed. Handle 14 is then rotated by again grasping grip member 42 so that pin 34 is again aligned with slot 28. If necessary handle 14 might be pulled slightly to the right of FIG. 6 so that pin 34 is not in sliding contact with the surface of flange or plate 26. After pin 34 is aligned with slot 28 the resilient force of spring 36 urges handle 14 to the left and this motion continues until pin 34 contacts the loop 30 of abutment member 28 to again lock handle 14 in its second position. When in this second position arm 12 has been moved to its motor drive engagement position shown in FIG. 2. This procedure is repeated for the other drive. Upon actuation of the hydraulic motor, each cable 3 is retracted or rewound on its spool or gear box 11 to pull the vehicle closer to tow truck 1 for the conventional towing operation.

It is to be understood that while this invention has particular utility and has been described with respect to the selective engagement and disengagement of a motor drive on a tow truck, the concepts of this invention may be practiced in any condition where it is desired to actuate a remotely located arm.

What is claimed is:

1. A control mechanism for selective engagement and disengagement of a motor drive having a control arm which is pivotally movable in a plane to a first engaging position and a second disengaging position, said mechanism comprising an elongated handle, said handle having a free end which may be grasped by a user, said handle having an opposite end pivotally and rotatably connected to the pivotally movable control arm, said handle being selectively slidably movably mounted in a longitudinal direction in the plan of control arm movement to a first position and a second position corresponding to the engaging and disengaging positions of the pivotally movable control arm, lock means for selectively holding said handle in each of said two positions, said lock means comprising a pair of longitudinally spaced abutments, said handle being rotatably mounted for selective contact with each of said abutments in accordance with the sliding and rotatable movements of said handle, and resilient means for selectively maintaining said handle in a locked position.

2. In a tow truck having a motor drive which drives a winch having a towing cable thereon, said motor drive having a control arm for controlling selective engagement and disengagement of said motor drive, and said control arm being pivotally mounted for pivotal movement in a plane to a first engaging position and to a second disengaging position, the improvement being in a control mechanism for the selective engagement and disengagement of said motor drive, said mechanism including a elongated handle, said handle having a free end extending to a side of said truck whereby said free end may be grasped by a user standing at the side of said truck said handle having an opposite end pivotally and rotatably connected to said control arm, said handle being selectively slidably movably mounted in a longitudinal direction in said plane of control arm movement to a first position and a second position corresponding to the engaging and disengaging positions of said control arm, lock means for selectively holding said handle in each of said two positions, said lock means comprising a pair of longitudinally spaced abutments, said handle being rotatably mounted for selective contact with each of said abutments in accordance with the sliding and rotatable movements of said handle, and resilient means for selectively maintaining said handle in its locked position.

3. In the truck of claim 2 wherein each of said abutments has an opening, said handle being slidably mounted for said movement through said openings in said abutments, and a stop member secured to said handle for selective contact with each of said abutments.

4. In the truck of claim 3 wherein one of said abutments comprises a plate having a longitudinal slot, said slot comprising said opening for the movement of said handle, and said stop member being a pin whereby rotation of said handle permits said pin to be moved into and out of alignment with said slot.

5. In the truck of claim 4 wherein the other of said abutments comprises an eye, and said plate being located between said free end and said eye.

6. In the truck of claim 5 wherein said plate is mounted at a nonperpendicular and nonparallel angle to said handle.

7. In the truck of claim 6 including a bracket for securement to a support member, said plate comprising an offset extension of said bracket, and said eye being mounted to said bracket.

8. The truck of claim 2 including two sets of said control arms aligned with each other for pivotal movement in said plane, and a separate one of said mechanisms being connected to each of said control arms.

9. A control mechanism for selective engagement and disengagement of a motor drive having a control arm which is movable to a first engaging position and a second disengaging position, said mechanism comprising an elongated handle for connection to the control arm, said handle being selectively movably mounted to a first position and a second position corresponding to the engaging and disengaging positions of the control arm, lock means for selectively holding said handle in each of said two positions, resilient means for selectively maintaining said handle in its locked position, said lock means including two spaced abutments, each of said abutments having an opening, said handle being slidably mounted for said movement through said openings in said abutments, a stop member secured to said handle for selective contact with each of said abutments, one of said abutments comprising a plate having a longitudinal slot, said slot comprising said opening for the movement of said handle, said stop member being a pin, said handle being rotatable to permit said pin to be moved into and out of alignment with said slot, the other of said abutments comprising an eye, said handle having a free end which may be grasped by an operator of said mechanism, said plate being located between said free end and said eye, said plate being mounted at a nonperpendicular and nonparallel angle to said handle, a bracket for securement to a support member, said plate comprising an offset extension of said bracket, said eye being mounted to said bracket, said bracket including a base portion mounted at a nonparallel and nonperpendicular angle to said handle and to said plate, and said eye being mounted perpendicularly to said base.

10. The mechanism of claim 9, wherein said resilient means is a coil spring fixed to said handle and mounted between a pair of disks on a side of said eye remote from said plate.

11. The mechanism of claim 10, in combination therewith, wherein there are two identical sets of said mechanism.

12. The mechanism of claim 11, in combination with a motor drive having a control arm to control the engagement and disengagement of said motor drive, and said handle being mounted to said control arm for controlling the position of said arm in accordance with the position of said handle.

13. The combination of claim 12 wherein said motor drive drives a winch having a cable thereon.

14. The combination of claim 12 wherein said motor drive is part of a tow truck, and a hook being secured to said cable.

15. The combination of claim 14 wherein said control arm is located generally along the longitudinal center of said truck remote from said hook, and said handle extending to an edge of a side of said truck.

* * * * *